United States Patent [19]

Gessell et al.

[11] Patent Number: 5,276,116

[45] Date of Patent: Jan. 4, 1994

[54] COMPOSITION AND METHOD FOR FRICTION LOSS REDUCTION

[75] Inventors: Donald E. Gessell; Paul H. Washecheck, both of Friendswood, Tex.

[73] Assignee: Conoco Inc., Ponca City, Okla.

[21] Appl. No.: 994,580

[22] Filed: Dec. 21, 1992

Related U.S. Application Data

[60] Continuation-in-part of Ser. No. 513,403, Apr. 23, 1990, abandoned, which is a division of Ser. No. 271,474, Nov. 14, 1988, Pat. No. 4,952,738.

[51] Int. Cl.$^5$ .................... C08F 4/649; C08F 212/36; C08F 230/08
[52] U.S. Cl. .................... 526/128; 526/279; 526/336
[58] Field of Search .................... 526/128

[56] References Cited

U.S. PATENT DOCUMENTS

| 2,989,515 | 6/1961 | Bruton et al. | 526/336 |
| 3,408,340 | 10/1968 | Tanaka et al. | 526/128 |
| 4,945,142 | 7/1990 | Gessell et al. | 502/125 |

FOREIGN PATENT DOCUMENTS 45-30830  10/1970  Japan .................... 520/128

Primary Examiner—Edward J. Smith
Attorney, Agent, or Firm—C. R. Schupbach

[57] ABSTRACT

Fluid flow friction loss of a hydrocarbon liquid is improved by adding a small amount of a copolymer of divinylbenzene and a linear alpha-olefin or a copolymer of vinyl siloxane and a linear alpha-olefin to the liquid hydrocarbon. A preferred catalyst for producing these materials is also described.

5 Claims, No Drawings

COMPOSITION AND METHOD FOR FRICTION LOSS REDUCTION

This is a continuation in part of application U.S. Ser. No. 07/513,403 filed Apr. 23, 1990 now abandoned, which is a divisional of U.S. Pat. No. 4,952,738 issued Aug. 28, 1990 based on application U.S. Ser. No. 271,474 filed Nov. 14, 1988.

BACKGROUND AND SUMMARY OF THE INVENTION

When fluids are pumped through a conduit, such as a pipeline, friction resulting from the movement of the fluid over the inside surface of the conduit causes a pressure drop in the fluid which increases as the downstream distance from the pump increases. Because of the loss in pressure, it is usually necessary to install additional pumps at selected points along the pipeline to keep the fluid moving at the desired rate in the conduit. Sometimes it is desirable to increase the throughput of fluids through conduits but this cannot always be satisfactorily accomplished by installing additional booster pumps. The flow rate of the fluid through the conduit can also be increased by reducing the friction of the fluid in the conduit. Accordingly, it would be desirable to find an efficient technique for reducing the pressure loss due to friction, commonly referred to as "friction loss" or "drag".

One method of reducing friction loss in fluids moving through conduit is to inject into the fluid a substance which is capable of reducing the friction loss of the fluid moving through the conduit. Such substances must not only reduce the friction loss of the fluid, but must be compatible with the fluid and must not interfere with the intended use of the fluid.

A variety of polymeric materials have been used or disclosed for use as "fluid loss" additives. For example, U.S. Pat. No. 3,692,676 discloses the reduction of friction loss in hydrocarbon liquids flowing through pipelines by adding to such liquids small amounts of homopolymers or copolymers of alpha-olefins having from 6 to 20 carbon atoms. Fluid loss additives are also disclosed in U.S. Pat. No. 3,215,154, which teaches the use of polyisobutylene as a hydrocarbon liquid friction loss reducing agent; U.S. Pat. No. 3,434,485, which discloses the use of low molecular weight polybutene to reduce friction loss in a crude oil pipeline; U.S. Pat. Nos.: 3,351,079; 3,493,000; 3,559,664 and 3,682,187, which disclose the addition of copolymers of ethylene and propylene or other low molecular weight alphamonoolefin to hydrocarbon fluids as fluid flow friction loss reducing additives; and U.S. Pat. No. 3,454,379, which describes the addition of low molecular weight polyethylene to distillate hydrocarbon fuel oil to improve the pumpability of the fuel oil.

Friction loss additives vary in their effectiveness. Usually the more effective additives are those of higher molecular weight. More often increasing the molecular weight (inherent viscosity) of the polymer increases the percent drag reduction obtained, within the limitations that the polymer must be capable of dissolving in the hydrocarbon liquid in which friction loss is effected.

According to this invention compositions comprising hydrocarbon liquids having reduced friction loss are obtained by adding to such hydrocarbons small amounts of high molecular weight non-crystalline, hydrocarbon soluble polymers prepared by copolymerizing (1) divinylbenzenes with linear alpha-olefins and (2) vinylsiloxanes with linear alpha-olefins. In one aspect the invention relates to the method of reducing friction loss of hydrocarbon streams flowing through conduits by adding such non-crystalline, hydrocarbon soluble copolymers to such hydrocarbon streams.

PRIOR ART

U.S. Pat. No. 3,157,624 to de Vries et al discloses copolymers of straight chain olefins and a styrene which may be used as lubricating oil additives, fuel additives, etc.

U.S. Pat. No. 4,190,069 and U.S. Pat. No. 4,341,684 both to Krantz disclose olefin-styrene copolymers as friction agents.

U.S. Pat. No. 4,212,312 to Titus discloses styrene-ethylene copolymers as friction reducing polymers. U.S. Pat. No. 4,384,089 discloses a fluid friction reducing copolymer of two or more alpha-mono-olefins where the polymerization is carried out at zero degrees centigrade or lower in the presence of a Ziegler catalyst. U.S. Pat. No. 4,527,581 to Motier discloses copolymers of butene-1 and another alpha-mono-olefin having 5-20 carbon atoms for reducing friction loss. The polymerization may be carried out at $-3$ to $-6$ degrees centigrade.

U.S. Pat. No. 4,420,593 to Sato et al uses catalyst electron donors such as ether and acceptors such as siloxanes. U.S. Pat. No. 4,229,318 to Mueller-Tamm et al shows treating the titanium portions of a Ziegler-Natta catalyst before activation with an organoaluminum for ethylene polymerization. U.S. Pat. Nos. 4,493,904 and 4,415,714 to Mack et al. show Ziegler-Natta catalysts modified by ketones and ethers for production of drag-reducing substances.

U.S. Pat. No. 4,358,572 to Mack et al deals with a method of forming high molecular weight drag reducing polymers using Ziegler-Natta catalysts where the polymerization polymer content is no more than 20 weight percent.

DETAILED DESCRIPTION OF THE INVENTION

The divinylbenzene monomers employed in the preparation of the divinylbenzene-linear alpha-olefins copolymers used in the compositions and method of this invention may be mixtures of the ortho, meta or para substituted compounds or may be single divinylbenzenes. The linear alpha-olefin comonomers are limited only by the desired inherent viscosity of the copolymers obtained and the requirement that such copolymers be soluble in the hydrocarbon portion of the reduced friction loss compositions. Generally the linear alpha-olefins used will have from 2 to about 20 carbon atoms and preferably from about 6 to about 14 carbon atoms. Specific examples of preferred materials are 1-hexene, 1-octene, 1-decene, and 1-dodecene.

The vinylsiloxane monomers employed in carrying out the invention have the general formula

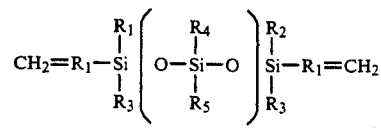

In which $R_1$ may be $CH_2$ to $CH_{20}$, $R_2$, $R_3$, $R_4$ and $R_5$ may be alike or different and may be H, alkyl (usually $C_1$ to $C_4$), alkoxy, phenyl, vinyl, or halogen and varies from 1 to about 100. Specific but non-limiting examples of vinylsiloxanes are vinyldimethyl terminated

| polydimethylsiloxane, | vinylphenylmethyl | terminated |
| polymethylphenylsiloxane, | vinyldiethyl | terminated |
| polymethylethoxysiloxane, | divinylmethyl | terminated |
| polyethylbydiosiloxane, | vinylethylmethyl | terminated |
| polyphenylchlorosiloxane, | vinyldiethoxy | terminated |
| polydiphenylsiloxane, | vinyldiphenyl | terminated |
| polymethylpropylsiloxane, | and divinylmethyl | terminated |
| polydimethylsiloxane. | | |

The copolymers used in the invention ordinarily have an inherent viscosity of at least about 9.0 and their inherent viscosities are usually in the range of about 12.0 to about 19.0. This comprises a molecular weight range of higher than about 1 million, normally above about 10 million. The copolymers are generally made up of from about 0.001 to about 5 mole percent divinylbenzene or vinylsiloxane and from about 95 to about 99.999 mole percent olefin, preferably from 0.1 to about 5 mole percent divinylbenzene or vinylsiloxane and from about 95 to 99.9 mole percent olefin. The concentration of olefin used in each copolymer will vary depending on the inherent viscosity desired in the resulting product. The copolymers are added to the hydrocarbon liquid at a concentration which is effective to produce the desired friction loss reduction. Usually the amount of copolymer provided is between about 1 and about 25 ppm, but it may be from as low as 0.1 ppm to as high as 1000 ppm or higher. It is also preferred that at least 40 mole percent of such alpha-olefins is $C_6$ or larger.

The catalysts used in the preparation of the copolymers are of the Ziegler-Natta type and comprise a titanium halide of the general formula $TiX_m$ where m is from 2.5 to 4 and X is a halogen and a co-catalyst such as an organoaluminum or organoaluminum halide of the general formula $AlR_mX_{3-n}$ where R is a hydrocarbon radical, X is a halogen and n is 2 or 3.

Catalysts which are capable of producing a polymer having a very high molecular weight, as measured by inherent viscosity of at least 12.0, are preferred. Such catalysts are prepared under inert atmosphere and comprise
(i) a transition metal halide of the general formula $MX_t$ wherein M is titanium or vanadium, and $t$ is equal to 2.5 to 4.0, and X is a halogen;
(ii) An organoaluminum or organoaluminum halide co-catalyst of the formula $AlRnX_{3-n}$, wherein R is a hydrocarbon radical containing from 1 to 20 carbon atoms, X is a halogen, and n is 2 or 3;
(iii) a polysiloxane of the general formula

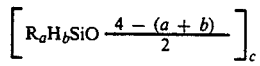

$$\left[ R_aH_bSiO\frac{4-(a+b)}{2} \right]_c$$

wherein R is hydrogen, an alkyl group containing from 1 to 20 carbon atoms, an aryl group, an aralkyl group or alkaryl group containing from 6 to 20 carbon atoms, a and b are greater than 0, wherein the sum (a+b) does not exceed 3, and c is 1 or more,
(iv) together with at least 1 second electron donor, selected from the group consisting of ethers, esters, amines, phosphines, piperidines, phosphites, phosphates, pyridines, and sulfides. The catalyst is then contacted with at least one alpha-olefin containing from 2 to 20 carbon atoms where at least 40 mole percent of each olefins are $C_6$ and larger, and carrying out the polymerization Preferably, the polysiloxane utilized in the catalyst is a hydropolysiloxane having an a value of from 0.1 to 2, a b value of 1, 2 or 3, and wherein the sum (a+b) does not exceed 3. In a most preferred embodiment, the transition metal halide and diethyl ether first modifier are allowed to react for at least 3 minutes preferably 5 minutes, before completing the catalyst preparation allowing such reaction time provides an increase in inherent viscosity.

Preferably, but not critical to the present invention, are polymerization temperatures no higher than 40° C.

It is also preferred that the materials polymerized contain at least one alphaolefin having from 4 to 30 carbon atoms.

Representative but non-exhaustive examples of olefins useful in the present invention are ethylene, propylene, butene-1, pentene-1,4-methylpentene, 1,3-methylbutene-1, octene-1, decene-1, hexene-1, octydecene-1 and dodecene-1. These olefins can of course be used alone, but in the present invention are copolymerized with divinyl benzene and vinyl siloxanes.

The catalyst can be prepared as a slurry, using a hydrocarbon diluent. These materials are inactive hydrocarbon solvents with respect to the polymerization. Examples of such materials are straight chain aliphatic compounds or branched hydrocarbons such as ethane, propane, butane, pentane, hexane, heptane or octane. Also suitable are alicyclic hydrocarbons such as cyclohexane, methyl cyclopentane and tetralin. In addition, aromatic hydrocarbons can be used such as benzene, toluene, and xylene. Of course, mixtures and analogues of these compounds can be used such as Molex (trademark of Universal Oil Products) raffinate which is a complex mixture of branched aliphatic, cyclic aliphatic, aromatic, and trace amounts (2-3%) of unbranched aliphatic hydrocarbons. The hydrocarbon diluent can also be an alpha-olefin.

Catalyst modifiers are materials which activate the catalyst while allowing the catalyst to remain in the form of a finely divided slurry. In the present invention, these activating catalyst modifiers are weak to moderately strong Lewis bases, as defined in *Advanced Organic Chemistry: Reactions. Mechanisms, and Structures*, March, J, McGraw-Hill Book Company, 1968, page 227. Concisely stated, a Lewis base is a compound with an available pair of electrons either unshared or in a orbital. These materials are catalyst poisons (or deactivators) when present in larger quantities. Conversely, this same Lewis basicity which poisons the catalyst must be present in a lesser activating amount, since the total absence of Lewis base provides no enhanced activity and simply dilutes the catalyst.

Representative but non-exhaustive examples of such modifying agents are ethers, amines, phosphines, piperidines, phosphites, phosphates, pyridines, esters and sulfides. Of these, ethers and amines are preferred activating agents, since better activity is found and the catalyst is less sensitive to deactivation.

Ether activators are selected from alkyl ethers wherein ether oxygen is attached directly to two aliphatic groups and may have aromatic substituents; aryl ethers wherein the ether oxygen is attached directly to two aromatic groups; aryl alkyl ethers wherein the ether oxygen is attached directly to one aliphatic and one aromatic group; and cyclic ethers wherein the ether oxygen is an integral part of a ring structure. The ether can therefore contain alkyl, aryl, aryl alkyl, or alkyl aryl groups, each containing from 1 to 30 carbon atoms, and cycloalkyl ethers containing from 2 to 30 carbon atoms. These materials can be used at modifier to titanium molar ratios of up to 10.0.

Representative but non-exhaustive examples of alkyl ethers are benzyl ether, tert-butyl methyl ether, di-n-butyl ether, diisopropyl ether, and di-n-propyl ether. Representative examples of cyclic ethers are cyclododecene oxide, cyclohexene oxide, cyclooctene oxide, cyclopentene oxide, dibenzylfuran, dihydropyran, furan, 2-methylfuran, 3-methylfuran, 2-methyltetrahydrofuran, 3-methyltetrahydrofuran, styrene oxide, and tetrahydrofuran. Representative examples of aryl ethers are m-phenoxytoluene and phenyl ether. Representative examples of aryl alkyl ethers are anisole, butyl phenyl ether, m-dimethoxybenzene, p-dimethoxybenzene, 2,6-dimethoxytoluene, 1-methoxynaphthalene, and 2-methoxynaphthalene.

Representative but non-exhaustive examples of amines useful in the present invention are tri-n-butyl amine, diisopropyl ethyl amine, dibutyl amine, trimethyl amine, tri-n-propyl amine, tri-i-propyl amine, tribenzyl amine, tri(4-methyl phenyl) amine, triphenyl amine, dimethyl phenyl amine, di-sec-butyl benzyl amine, ethyl propyl phenyl amine, diisopropyl ethyl amine, diisopropyl amine, di-n-butyl amine, dibenzyl amine, diphenyl amine, benzyl methyl amine, benzyl phenyl amine, and n-butyl-i-propyl amine. These amines can be used in amine to titanium mole ratios of up to 5.0.

Representative but non-exhaustive examples of phosphines useful in the practice of the present invention are tributyl phosphine, trioctyl phosphine, trimethyl phosphine, triphenyl phosphine, dibenzyl phenyl phosphine, diphenyl butyl phosphine, dioctyl benzyl phosphine, dihexyl methyl phosphine, di-cyclo-pentyl ethyl phosphine, hexyl methyl-i-propyl phosphine, and ethyl(2-phenyl ethyl)phenyl phosphine. These phosphines can be used in phosphine to titanium mole ratios of up to 3.0.

Representative but non-exhaustive examples of phosphates useful in the practice of the invention are tributyl phosphate, dimethyl octyl phosphate, diphenyl propyl phosphate, di-s-butyl benzyl phosphate, trioctyl phosphate, tribenzyl phosphate, and decyl ethyl phenyl phosphate. These phosphates can be used in phosphate to titanium mole ratios of up to 3.0.

Representative but non-exhaustive examples of piperidines useful in the practice of the present invention are 2,2,6,6-tetramethyl piperidine, 3,3,5,5-tetraethyl Piperidine, 2,2,6-tri-n-butyl piperidine, 2,6-diphenyl-2,6-dimethyl piperidine, 2,6-dibenzyl-2,6-diethyl piperidine, 2,6-dioctyl piperidine, and 2,6-diphenyl piperidine. These piperidines can be used in piperidine to titanium mole ratios of up to 3.0.

Representative but non-exhaustive examples of sulfides useful in the practice of the present invention are n-hexyl sulfide, n-butyl sulfide, sec-butyl sulfide, n-decyl sulfide, di(2-phenyl propyl)sulfide, phenyl-i-octyl sulfide, benzyl methyl sulfide, phenyl sulfide, and (4-methyl phenyl)sulfide. These sulfides can be used in sulfide to titanium mole ratios of up to 3.0.

Representative but non-exhaustive examples of esters useful in the practice of the present invention are methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, 2-ethylhexyl toluylate, methyl anisate, ethyl anisate, propyl anisate, methyl napthoate, 2-ethylhexyl napthoate, and ethyl phenylacetate. These esters can be used in ester to titanium mole ratios up to 3.0.

Representative but non-exhaustive examples of phosphites useful in the practice of the present invention are tri-n-propyl phosphite, tri-n-butyl phosphite, tri-i-octyl phosphite, di-s-butyl-n-decyl phosphite, dibenzyl-n-hexyl phosphite, diphenyl-i-heptyl phosphite, diethyl phenyl phosphite, benzyl methyl phenyl phosphite, and cyclo-pentyl ethyl octyl phosphite. These phosphites can be used in phosphite to titanium mole ratios of up to 3.0.

Representative but non-exhaustive examples of hydropolysiloxanes useful in the practice of the present invention are polymethylhydrosiloxane (PMHS), polyethylhydrosiloxane, polyethoxyhydrosiloxane, polymethylhydro-dimethylsiloxanecopolymer, polymethylhydromethyloctylsilloxane copolymer, polyethoxyhydrosiloxane, tetramethyldisiloxane, diphenyldisiloxane, trimethylcyclotrisiloxane, tetramethylcyclotetrasiloxane, polyphenylhydrosiloxane, polyeicosylhydrosiloxane, polychlorophenylhydrosiloxane, and mixtures of these.

Representative but non-exhaustive examples of silicon materials which are useful in the present invention are trimethylhydroxysilane, triethylhydroxysilane, triphenylhydroxysilane, methyldiphenylhydroxysilane, benzyldiphenylhydroxysilane, diethyldihydroxysilane, dipropyldihydroxysilane, dialkyldihydroxysilane, dicyclohexyldihydroxysilane, diphenyldihydroxysilane, butyltrihydroxysilane, phenyltrihydroxysilane, polymethylhydrosiloxane (PMHS), polyethylhydrosiloxane, polymethylhydridodmethylsilloxane copolymer, polymethylhydromethyloctylsilloxane copolymer, polyethoxyhydrosiloxane, tetramethyldisiloxane, diphenyldisiloxane, trimethylcyclotrisiloxane, tetramethylcyclotetrasiloxane, polyphenylhydrosiloxane, and polychlorophenylhydrosiloxane.

Generally, the catalyst of the instant invention is prepared as a catalyst slurry which comprises the titanium component and a hydrocarbon diluent. The hydrocarbon diluents are inactive with respect to polymerization and are hydrocarbon solvents. Examples of such materials are straight-chain aliphatic compounds or branched hydrocarbons such as ethane, propane, butane, pentane, hexane, heptane, or octane. Also suitable are alicyclic hydrocarbons such as cyclohexane, methylcyclopentane, and tetralin. Aromatic hydrocarbons can be used as represented by benzene toluene, and xylene. Mixtures and analogs of these compounds can be used, such as refined kerosenes, which are complex mixtures of aliphatic, cyclic aliphatic, and aromatic hydrocarbons. This hydrocarbon diluent can also contain a portion of an alpha olefin.

Preferred modifying agents are monoether compounds of the formula $R_1OR_2$, where $R_1$ and $R_2$ are, independently, aryl, alkyl, cycloalkyl, aralkyl or alkoxyl, each containing from 1 to 20 carbon atoms or a polyvinyl siloxane or silicones such as polydimethylsiloxane or polymethylhydrosiloxane.

The catalysts used and the methods of preparing the copolymers are not critical to the copolymers of the present invention. The novel dual modifier catalyst described is preferred since polymers of very high molecular weight are obtained from this catalyst. A typical polymerization procedure is to contact the monomeric mixture with the catalyst in a suitable inert hydrocarbon solvent for the monomers and the catalyst in a closed reaction vessel at reduced temperatures and autogenous pressure and in a nitrogen atmosphere. Further details of the Ziegler process and suitable catalyst components other than the siloxanes are set forth in U.S. Pat. No. 4,493,904 which is incorporated by reference.

Any of the polyvinyl siloxanes previously mentioned may be used as catalyst modifiers in the preparation of desired copolymers. In addition siloxanes which are terminated with other groups, such as hydride, amino and carbinol may be used. Also useful are siloxanes which do not contain terminal functional groups.

The copolymers may be diluted with a solvent prior to combining them with the hydrocarbon liquid portion of the reduced friction loss compositions. Suitable solvents include kerosene, naphtha and other petroleum distillates and saturated hydrocarbons such as hexane, heptane, octane, etc. While other methods of introduction may be employed the copolymers can conveniently be added to the hydrocarbon liquid by continuous injection into the carrier conduit by means of proportionating pumps situated at desired locations along the conduit.

Several types of titanium trichloride are available commercially, most sold by Stauffer Chemical Co., USA. Most are prepared by the reaction of titanium tetrachloride with aluminum. The well-known type 1.1 catalyst is titanium chloride, containing approximately ⅓ mole of aluminum trichloride per mole of titanium trichloride (also known of TiCl$_3$AA).

The following examples are presented in illustration of specific embodiments of the invention.

In each of the following examples the copolymers were prepared by adding diluted monomers to a dry, cleaned bottle kept in a nitrogen atmosphere. The bottle, capped with a rubber septum, was placed in a bath at 0° centigrade. An aliquot of the catalyst was then injected into the bottle using a nitrogen purged syringe. After 24 hours the polymerization was stopped by adding a kill solution to the bottle.

EXAMPLE 1

A series of runs were made to prepare copolymers of divinylbenzenes (a mixture of isomers, predominately the para isomer) and 1-hexene or 1-decene. The catalysts used were aluminum reduced TiCl$_4$ (TiCl$_3$AA) and diisobutylaluminum chloride (DIBAC), modified with dibutylether (DBE) or polymethylhydridosiloxane (PMHS). The reactions were carried out in Molex raffinate solvent with a co-catalyst/Ti ratio of 8.0, a DBE/Ti ratio of 1.0, a PMHS/Ti ratio of 0.5 and an olefin/Ti ratio of 400. The results are set forth in Table 1.

TABLE 1

| Run No. | Catalyst | Monomers* | Polymer Percent | Polymer IV |
|---|---|---|---|---|
| 1 | TiCl3AA/DIBAC/PMHS | DVB-5 ml 1-Decene - 60.5 ml | 2.57 | 17.1 |
| 2 | TiCl3AA/DIBAC/PMHS | DVB-10 ml 1-Decene - 60.5 ml | 7.25 | 14.0 |
| 3 | TiCl3AA/DIBAC/PMHS | DVB-20 ml 1-Decene - 60.5 ml | 1.42 | 19.9 |
| 4 | TiCl3AA/DIBAC/DBE | DVB-5 ml 1-Decene - 60.5 ml | 7.57 | 13.9 |
| 5 | TiCl3AA/DIBAC/DBE | DVB-10 ml 1-Decene - 60.5 ml | 3.18 | 15.2 |
| 6 | TiCl3AA/DIBAC/DBE | DVB-20 ml 1-Decene - 60.5 ml | 6.76 | 15.2 |
| 7 | TiCl3AA/DIBAC/PMHS | DVB-5 ml 1-Hexene - 65.7 ml | 3.99 | 16.1 |
| 8 | TiCl3AA/DIBAC/PMHS | DVB-20 ml 1-Hexene - 65.7 ml | 4.36 | 13.8 |
| 9 | TiCl3AA/DIBAC | DVB-5 ml 1-Hexene - 65.7 ml | 2.42 | 16.0 |
| 10 | TiCl3AA/DIBAC | DVB-20 ml 1-Hexene - 65.7 ml | 3.33 | 13.9 |
| 11 | TiCl3AA/DIBAC/DBE | DVB-5 ml 1-Hexene - 65.7 ml | 8.94 | 13.3 |
| 12 | TiCl3AA/DIBAC/DBE | DVB-20 ml 1-Hexene - 65.7 ml | 9.80 | 14.7 |

*DVB is a mixture of divinylbenzene isomers, predominately the para-isomer.

Drag reduction tests were carried out with the copolymers of Table 1 in a 1" test loop, using diesel fuel as the hydrocarbon liquid. The tests were carried out at a temperature of 100° F. with a flow rate of 12 gallons per minute. The copolymers were added to the diesel fuel in a solution of 0.1 weight percent. Additionally, tests were carried out using decene homopolymer having an IV of 18.0 (comparison to runs 1 and 3) and hexene homopolymer having an IV of 16.1 (comparison to run 7). Homopolymers were prepared and tested in the same manner as the divinylbenzenes of the present invention. The results of the tests are presented in Table 2.

TABLE 2

| Copolymer from Run No. | Amount of Drag Reducing Polymer Added | Percent Drag Reduction | Homopolymers |
|---|---|---|---|
| 1 | 0.30 ppm | 44.3 | 30.3 |
|  | 0.50 ppm | 52.7 | 41.6 |
|  | 0.70 ppm | 53.7 | 49.5 |
| 3 | 0.30 ppm | 37.0 | 30.3 |
|  | 0.50 ppm | 49.1 | 41.6 |
|  | 0.70 ppm | 51.5 | 49.5 |
| 7 | 0.30 ppm | 30.1 | 21.5 |
|  | 0.50 ppm | 39.4 | 30.4 |
|  | 0.70 ppm | 41.0 | 35.8 |

Test results show a distinct advantage in drag reduction for lower concentrations of drag reducing additives of the present invention. Such improvement allows for less expense in achieving drag reduction by lowering costs of transportation to remote injection sites.

EXAMPLE 2

Another series of runs were made to prepare copolymers of polydimethyl siloxane (vinyldimethyl terminated) and 1-decene. The catalysts used were TiCl$_3$AA and DIBAC, and TiCl$_3$AA and DIBAC modified with DBE and vinyl terminated polydimethyl siloxane. The reactions were carried out in Molex raffinate solvent with a co-catalyst/Ti ratio of 8.0, a DBE/Ti ratio of 1.0; a PMMS/Ti ratio of 0.5, and an olefin/Ti ratio of 400. The results are set forth in Table 3.

TABLE 3

| Run No. | Catalyst | Monomers | Polymer Percent | Polymer IV |
|---|---|---|---|---|
| 1 | TiClAA/DIBAC/DBE/PMMS | PMMS-5 ml 1-Decene - 60.5 ml | 7.51 | 16.53 |
| 2 | TiClAA/DIBAC/DBE/PMMS | PMMS-10 ml 1-Decene - 60.5 ml | 8.08 | 15.79 |
| 3 | TiClAA/DIBAC/DBE/PMMS | PMMS-20 ml 1-Decene - 60.5 ml | 8.45 | 15.83 |
| 4 | TiClAA/DIBAC/DBE/PMMS | PMMS-5 ml 1-Decene - 60.5 ml | 9.04 | 16.11 |
| 5 | TiClAA/DIBAC/DBE/PMMS | PMMS-10 ml 1-Decene - 60.5 ml | 9.21 | 15.91 |
| 6 | TiClAA/DIBAC/DBE/PMMS | PMMS-20 ml 1-Decene - 60.5 ml | 9.54 | 15.56 |
| 7 | TiClAA/DIBAC | PMMS-5 ml 1-Decene - 60.5 ml | 7.08 | 13.48 |
| 8 | TiClAA/DIBAC | PMMS-10 ml 1-Decene - 60.5 ml | 5.83 | 16.24 |
| 9 | TiClAA/DIBAC | PMMS-20 ml 1-Decene - 60.5 ml | 7.66 | 15.45 |

Drag reduction tests were carried out with the PMMS/decene copolymer of Run 6 in the same manner as in Example 1, with the results shown in Table 4.

TABLE 4

| Copolymer from Run No. | Amount of Copolymer Added | Percent Drag Reduction |
|---|---|---|
| 6 | 0.30 ppm | 41.0 |
|  | 0.50 ppm | 49.0 |
|  | 0.70 ppm | 52.2 |

Similar results are obtained when copolymers from the other runs are tested for drag reduction.

EXAMPLE 3

1. A catalyst was prepared by adding 10.0 ml of 0.200M TiCl₃AA (2.00 millimoles Ti) with 4.0 ml of 0.500M dibutyl ether (DBE) (2.00 millimoles DBE). The mixture was stirred for 5 minutes with the bottle capped; after which 7.7 ml of 1.05M dibutylaluminum chloride (7.98 mm DIBAC) was added, and the bottle stirred an additional 5 minutes. After stirring 1.00 ml 2.0M polydimethylsiloxane (2.00 mm PMMS) was added in 27.3 ml hexane. The catalyst had a total volume of 50.0 ml, where 20 ml. 0.7982 m moles Ti; Cocatalyst to titanium=40; DBE/Ti-1.0; PMMS/Ti-1.0.

2. A catalyst was prepared as described, except that DIBAC was added to the TiCl₃/DBE before stirring, and the entire mixture was stirred for 5 minutes.

3. A catalyst was prepared as described, except that after TiCl₃/DBE was combined and stirred for 5 minutes, all remaining catalyst components were added.

EXAMPLE 4

Polymerizations were carried out using the catalyst of Example 3. Bottle reactors were charged with 60.5 ml of decene-1 and sufficient molex sufficient to give a total volume of 500 ml. The bottles were equipped with magnetic stirrers, placed in a bath in a dry box and cooled to 0° C. Sufficient catalyst was added to give 0.7982 mm Ti. The bottles were maintained at 0° C. for 24 hours, and killed with 5.0 ml alcohol. All olefin to titanium molar ratios were 400.

Polymerization results:

| Catalyst | % Polymer | Inherent Viscosity |
|---|---|---|
| 3.1 | 9.10 | 16.3 |
| 3.1 | 9.88 | 16.2 |
| 3.2 | 9.23 | 16.3 |
| 3.2 | 9.30 | 16.1 |
| 3.3 | 9.06 | 16.7 |
| 3.3 | 8.88 | 16.7 |

The inherent viscosity was determined for each polymer produced using a Cannon-Ubbelohde four bulb shear dilution viscometer (0.1 g polymer/100 ml LPA solvent at 25° C.). Inherent viscosities (IV) were calculated at shear rates of 300 sec$^{-1}$.

It is known in the art that as inherent viscosities increase drag reduction also increases, since inherent viscosity is an indirect method of measuring polymer molecular weight, and drag reduction increases as molecular weight increases.

Example 2 is repeated as Example 5. The catalyst used is the same as described in 3.1. The resulting polymer has an inherent viscosity of at least 12 and provides drag reduction in hydrocarbons flowing through conduits.

While certain embodiments and details have been shown for the purpose of illustrating the present invention, it will be apparent to those skilled in this art that various changes and modifications may be made herein without departing from the spirit or scope of the invention.

We claim:

1. A method for the preparation of ultrahigh molecular weight hydrocarbon soluble drag reducing copolymers having an inherent viscosity of at least 12.0, wherein said copolymers contain up to about 5 mole percent divinylbenzene or vinylsiloxane, and the remainder linear alpha-olefins comprising (a) preparing under inert atmosphere a catalyst comprising
  (i) a transition metal halide of the general formula $MX_t$ wherein M is titanium or vanadium, and $t$ is equal to 2.5 to 4.0, and X is a halogen;
  (ii) an organoaluminum or organoaluminum halide catalyst of the formula $AlR_nX_{3-n}$, wherein R is a hydrocarbon radical containing from 1 to 20 carbon atoms, X is a halogen, and n is 2 or 3;
  (iii) a polysiloxane of the general formula

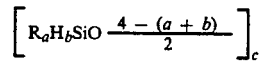

$$\left[ R_a H_b SiO \frac{4-(a+b)}{2} \right]_c$$

wherein R is hydrogen, an alkyl group containing from 1 to 20 carbon atoms, an aryl group, an aralkyl group or alkaryl group containing from 6 to 20 carbon atoms, a and b are greater than 0, wherein the sum (a+b) does not exceed 3, and c is 1 or more,
  (iv) together with at least 1 second electron donor, selected from the group consisting of ethers, amines, phosphines, phosphites, phosphates, and sulfides; and contacting the catalyst with at least one alpha-olefin containing from 2 to 20 carbon atoms, wherein at least 40 mole percent of such olefins are $C_6$ and larger, and divinylbenzene or vinylsiloxane, under polymerization conditions and carrying out the polymerization.

2. A method as described in claim 1 wherein the polysiloxane utilized in the catalyst is a hydropolysiloxane, where a has a value of from 0.1 to 2.0, b has a value of 1.0, 2.0 or 3.0, and wherein the sum (a+b) does not exceed 3.

3. A method as described in claim 1 wherein the transition metal halide and ether second electron donor are allowed to react for at least 3 minutes before completing the catalyst preparation.

4. A method as described in claim 3 wherein the materials polymerized contain at least one alphaolefin having from 4 to 30 carbon atoms.

5. A method as described in claim 4 wherein the olefins polymerized contain at least one olefin selected from the group consisting of ethylene, propylene, butene-1, pentene-1, 4-methylpentene, 1,3-methylbutene-1, octene-1, decene-1, hexene-1, octydecene-1, and dodecene.

* * * * *